United States Patent [19]

Leung et al.

[11] Patent Number: 4,905,231
[45] Date of Patent: Feb. 27, 1990

[54] MULTI-MEDIA VIRTUAL CIRCUIT

[75] Inventors: Wu-Hon F. Leung, Downers Grove; Michael J. Morgan, Warrenville; Shi-Chuan Tu, Lisle, all of Ill.

[73] Assignee: American Telephone and Telegraph Company, AT&T Bell Laboratories, Murray Hill, N.J.

[21] Appl. No.: 189,851

[22] Filed: May 3, 1988

[51] Int. Cl.[4] .......................... H04Q 11/04; H04J 3/24
[52] U.S. Cl. ....................................... 370/94.1; 370/60
[58] Field of Search ......................... 370/60, 44, 58, 95

[56] References Cited

U.S. PATENT DOCUMENTS 4,556,972 12/1985 Chan et al. ............................. 370/60
4,764,919 8/1988 Hunter et al. .......................... 370/60

OTHER PUBLICATIONS

Luderer, G. W. R., et al., "A Distributed UNIX System Based on a Virtual Circuit Switch", ACM Operating System Review, vol. 15, Proceedings of the Principles of Operating Systems Conference, Dec. 1981, pp. 160–168.
Muise, R. W., et al., "Experiments in Wideband Packet Technology", Proceedings of the 1986 International Zurich Seminar on Digital Communications, Mar. 11–13, 1986, pp. 135–139.
Stefik, M., et al., "Beyond the Chalkboard: Computer Support for Collaboration and Problem Solving in Meetings", Communications of the ACM, vol. 30, No. 1, pp. 32–47.
Suzuki, T., et al., "A Real-Time Electronic Conferencing System Based on Distributed UNIX", Proceedings of the USENIX Conference, Jun. 1986.
Thomas, R. H., et al., "Diamond: A Multimedia Message System Built on a Distributed Architecture", Computer, Dec. 1985, pp. 65–77.

Primary Examiner—Benedict V. Safourek
Assistant Examiner—Wellington Chin
Attorney, Agent, or Firm—Kenneth H. Samples

[57] ABSTRACT

A packet switch arrangement in which a first plurality of user devices is connected to a packet network by a first interface unit and a second plurality of user devices is connected to the packet network by a second interface unit. A virtual circuit is established between the interface units and control information is exchanged over the virtual circuit. The control information defines virtual channels on the virtual circuit and ones of the first and second pluralities of user devices which are to be sources and destinations for data in the defined virtual channels. Data from user devices is packetized and transmitted in the virtual channels by the interface units in accordance with the exchanged control information. Further, packets received in virtual channels on the virtual circuit are distributed to user devices by the interface units in accordance with exchanged control information.

16 Claims, 6 Drawing Sheets

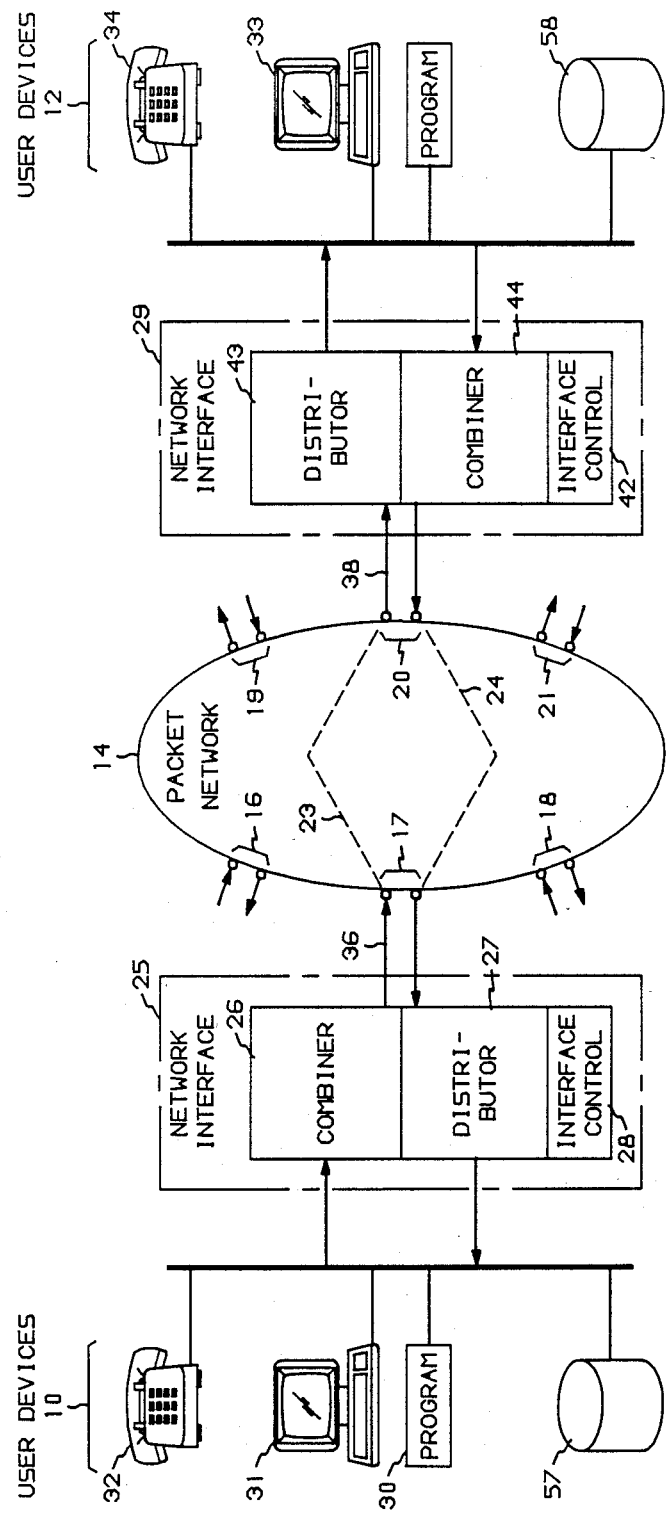
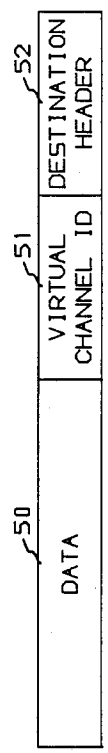
FIG. 1
FIG. 2

FIG. 9

LOCAL PARAMETER TABLE
FOR
INTERFACE CONTROL 28

| CHANNEL | LOCAL USER DEVICE | DISTANT USER DEVICE | TRANSMISSION CONTROL ASSOCIATIONS |
|---|---|---|---|
| 0 | CONTROL | CONTROL | NONE |
| 1 | TELEPHONE 32 | TELEPHONE 34 | NONE |
| 2 | TERMINAL 31 | TERMINAL 33 | CHANNELS 2 AND 3 |
| 3 | DISK 57 | DISK 58 | CHANNELS 3 AND 2 |

FIG. 10

LOCAL PARAMETER TABLE
FOR
INTERFACE CONTROL 42

| CHANNEL | LOCAL USER DEVICE | DISTANT USER DEVICE | TRANSMISSION CONTROL ASSOCIATIONS |
|---|---|---|---|
| 0 | CONTROL | CONTROL | NONE |
| 1 | TELEPHONE 34 | TELEPHONE 32 | NONE |
| 2 | TERMINAL 33 | TERMINAL 31 | CHANNELS 2 AND 3 |
| 3 | DISK 58 | DISK 57 | CHANNELS 3 AND 2 |

MULTI-MEDIA VIRTUAL CIRCUIT

FIELD OF INVENTION

This invention relates to digital packet communication systems and particularly to coordinated transmission and reception of signals among sources and destinations in such systems.

BACKGROUND OF THE INVENTION

Packet communication has proven technically reliable and commercially valuable for the communication of information which occurs in bursts, such as computer data and voice. The success achieved by packet communication relates in part to the fact that network bandwidth is not continuously required by one communicator but can be shared by many. Also packet communication can be readily handled by modern digital equipment.

A packet network path is established by call setup packets which traverse the packet network from an input port to an identified output port. Along the way network memories are updated so that network controller time is reduced for future packets which are to traverse the same path. A path established in this manner between two network ports is sometimes referred to as a virtual circuit.

Today, having multiple user devices, such as telephones and computer terminals, at one's disposal, is common. On many occasions communications from one individual to another may involve more than one type of user device. For example two people may be remotely communicating between their computer terminals while conversing on the telephone explaining their actions. It is important that the two portions of this type of communication be coordinated and easily controlled. The speech and typed information should arrive at the destination with approximately the same delay so that proper communication can be maintained and adding and removing channels should be as easy and transparent to the communicating individuals as possible.

Packet switching networks have been used to establish communication paths between multiple sources and multiple destinations. The devices however have been connected using multiple virtual circuits through the packet network. Coordinating communications over multiple virtual circuits is a difficult task. Time delays tend to be different for each path through the network. Adding channels can be difficult and time consuming since new path setup messages must be generated and transmitted through the network. Further, the coordination of different virtual circuits for purposes of transmission control e.g. flow control is a complex problem.

Digital packet communication is desirable for many of the types of communications occurring today. Arrangements and methods are needed which apply digital packet technology to simplify the above discussed multiple source and destination communication and which avoid the problems of communication coordination and control of the prior art.

SUMMARY OF THE INVENTION

The foregoing problems are solved and a technical advance is achieved in accordance with the principles of the invention which is a method and arrangement for use in a packet communication arrangement having first interface, a second interface and a virtual circuit through a packet network between the first and second interfaces. The method comprises communicating control information between the first and the second interface over the virtual circuit, the control information defining allocations of a plurality of virtual channels for communication of data packets in the virtual channels, and distributing data packets received from the virtual channels in accordance with the allocations defined in the control information. A method, also in accordance with the invention, comprises communicating control information as described above and generating on the virtual circuit, data packets for the communication in virtual channels defined by the allocations set forth in the control information. The establishment of a single virtual circuit between interfaces to the network permits exchange of control information so that the network interfaces can coordinate and control the use of the virtual channels for packet communication.

The packet communication arrangement includes a first plurality of user devices connected to the first interface and a second plurality for user devices connected to the second interface. A request for communication specifies one of the first and one of the second pluralities of user devices. A virtual channel identifier is assigned to the communication and information describing the virtual channel identifier, the specified first user device and the specified second user device is exhanged on the virtual circuit. This information is stored in the interfaces. Packets transmitted on the virtual circuit include data from the specified first user device and the virtual channel identifier assigned to communication from that user device. Received packets are then distributed to the specified second user device based on the information stored in the receiving interface.

A departure is that control packets are exchanged in a predetermined virtual channel. Information from these control packets is used to provide a parameter table at each network interface. This parameter table is accessed and used to formulate packets for transmission as well as to control the distribution of received packets. In addition to the virtual channel to source and destination mapping, a local parameter table is used to store other types of transmission control information. The invention provides for flow control on several related channels when one of the related channels exhibits a need for such. Control information regarding such related channels is stored in the parameter tables. The information in the parameter table is added to or modified via the virtual circuit so that the control exercised by the network interface is modified, for example, to add new virtual channels.

The interface arrangements comprise interface circuits connected to a plurality of data sources and destinations. Those circuits provide for the communication of control information over the virtual channels of a virtual circuit. That information includes control packets formulated and sent over the virtual channel to define a data destination. The packets are stored in source and destination interfaces at each end of the virtual circuit. The distribution of received data information packets is accomplished in the destination interface circuit by (1) determining the virtual channel of each received data packet, (2) reading the stored control information to identify the destination of data packets received in virtual channels and (3) conveying recent data packets to the identified destination. A data packet is produced on the virtual circuit by (1) accumulating data from a data source, (2) reading the stored control information to determine the virtual channel to convey data packets from the data source and (3) transmitting the accumulated data in the determined virtual channel.

A specific illustrative embodiment for coordinating the digital packet communication for multimedia telephone, computer terminal, disk storage, and program facilities is achieved by the interface circuits comprising distributor, combiner and control facilities with programmed control. Shared memory is advantageously used for the distributor and combiner circuitry.

BRIEF DESCRIPTION OF THE DRAWING

FIG. 1 is a block diagram of an embodiment of the invention;

FIG. 2 is a representation of a packet employed in the embodiments;

FIGS. 9 and 10 represent control information stored by interface control units in the embodiments.

DETAILED DESCRIPTION

Figure 3:
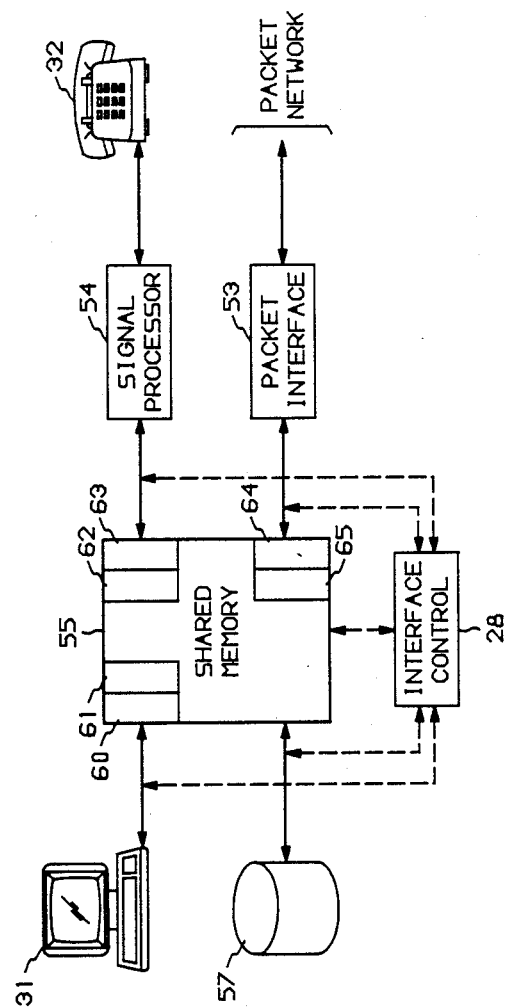
FIG. 3 is an embodiment of a network interface of FIG. 1.

FIG. 1 is a block diagram of a system embodying the present invention which includes a packet switching network 14 having a plurality of ports 16 through 21 used for input/output communication. Packet switching network 14 operates in the conventional manner to connect packets from network input ports to network output ports by means of virtual circuits. A virtual circuit in the present description is one which conveys packets applied to a given input port such as port 17 and destined for a given output port such as port 20 to the latter port in the same sequence in which they are applied to the given input port. Virtual circuits are represented in FIG. 1 as dotted lines 23 and 24 between input/output port 17 and input/output port 20. It should be noted that all packets between a given input and output port may not traverse the same physical path through the network provided that the sequence in which the packets exit the network is the same sequence in which they were introduced to the network.

FIG. 2 is a representation of the packets exchanged through packet network 14. Each packet comprises a data portion 50, a virtual channel identifier 51, and a destination header 52. The destination header 52 is used by the packet network in the known manner to route packets from a port, e.g. 17, via a virtual circuit to a port, e.g. 20. The virtual channel identifier 51 is used by the network interfaces, e.g. 25 and 29, to distinguish among multiple virtual channels (communications) conveyed by the same virtual circuit. In the following description packets including the same virtual channel identifier comprise a virtual channel. The use of virtual channel identifier 51 is discussed in greater detail later herein.

Returning to FIG. 1, the network interfaces, e.g. 25 and 29, associated with each group of user devices, are responsible for the coordination of communication between those groups of user devices. The primary responsibility for coordination is exercised by an interface controller, e.g. 28 and 42, in each network interface. An interface controller, e.g. 28, is a program controlled arrangement which responds to requests for connection to a destination network interface, e.g. 29, by communicating with packet network 14, so that a virtual circuit is established to the destination network interface. Once a virtual circuit is established interface controls 28 and 42 exchange control information packets over the virtual circuit. This control information is stored, as discussed below, in each interface control 28 and 42. The stored control information defines how data is to be accumulated from particular user devices, how this data is to be identified when conveyed on the virtual circuit, and how the data is to be distributed to selected user devices. Network interface 25 includes a combiner 26 which operates under the control of interface control 28 to accumulate data from the ones of user devices 10, which were defined in the request for connection. Interface control 28, in conjunction with combiner 26, formats the accumulated data into packets. The packets so formatted are then interleaved with one another and transmitted in identifiable virtual channels on the established virtual circuit. The process of interleaving the packets and transmitting them on a single virtual circuit maintains the timing relationships among the signals from different user devices 10. Network interface 25 also includes a distributor 27 which receives packets from network port 17. Distributor 27 operates under the control of interface control 28 to distribute received packets to selected ones of user devices 10 based on the exchanged and stored control information. The interface control 42 cooperates in a similar manner with distributor 43 and combiner 44 to accumulate packets for transmission to port 20 and to distribute packets received at port 20 to selected ones of user device 12. Data sources and destinations are referred to as user devices herein. User devices need not be hardware units. User devices include computer programs, e.g. 51 and software processes which may be running on the same terminal or computer.

Figure 4:
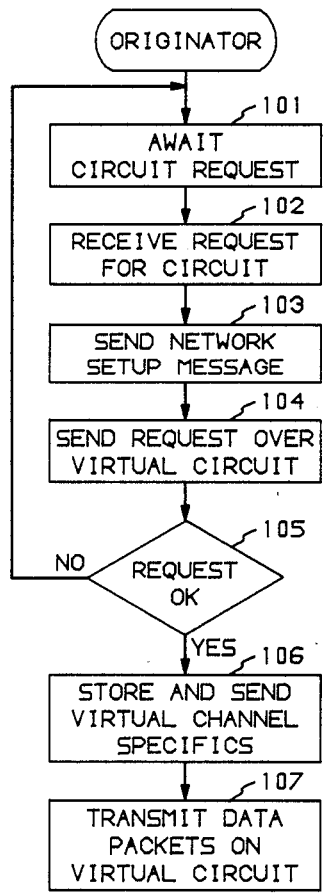
FIGS. 4 through 8 are flow diagrams of various operations performed by the embodiments.
Figure 5:
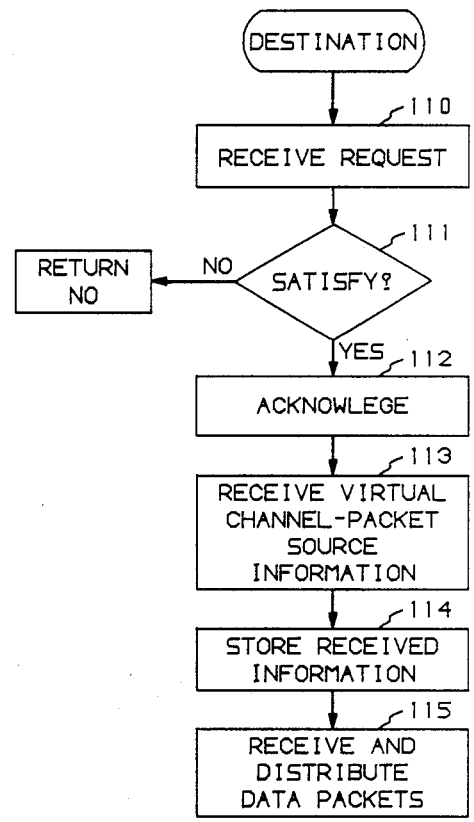

The following is an example of the establishment of communication paths between user devices 10 and 12 in response to request signals generated by an operator at a terminal 31. This example should be read with regard to FIG. 1 in conjunction with the flow diagrams of FIGS. 4 and 5. This example communication is to involve terminal 31 and telephone 32 and terminal 33 and telephone 34 of user devices 12. It should be noted that telephones 32 and 34 include digital to analog and analog to digital converters. Interface control 28 continuously monitors (block 101, FIG. 4) signals from user devices 10 for communication requests. When an operator types on keyboard 31, a sequence of commands requesting communication from specified ones of user devices 10 to specified ones of user devices 12, control 28 receives the commands (block 102, FIG. 4) and responds by beginning connection operations. In the present description network interface 25, which receives the original request, is referred to as the originator while the requested destination network interface 29 is referred to as the destination. First, virtual circuit set up packets are generated and transmitted (block 103, FIG. 4) to input/output port 17 via communication path 36. Illustratively, the set up packets request that a virtual circuit be established between the input port 17 connected to communication path 36 and the port 20. The set up packets also define certain attributes of the expected communication path such as expected bandwidth. The use of such attributes by a packet network is known in the art and not further described herein. Packet network 14 responds to set up packets in the well known manner by establishing the requested virtual communication paths as shown by dotted lines 23 and 24 in FIG. 1.

The primary control over the use of virtual circuits is provided by interface controls 28 and 42 at the end points of the virtual circuit. After the establishment of the virtual circuit, the interface controls exchange control messages to define how communication is to be carried out. Control messages comprise packets which have a virtual channel identifier of zero. Such packets are transmitted by the coordinated operation of combiner 26 and interface control 28. A receiving control, e.g. 42, monitors incoming packets and interprets each control packet received. Control messages include the information necessary for the coordination of actions of the two network interfaces in a communication. This includes information which defines the accumulation and distribution of packets to and from user devices. The first control packets exchanged are transmitted by interface control 28 (block 104, FIG. 4) over the established virtual circuit to interface control 42 of network interface 29 and request a communication with specified ones of user devices 12. In accordance with the present example, telephone 34 and terminal 33 are initially specified. Illustratively, upon receipt (block 110, FIG. 5) of the control packets, interface control 42 determines (block 111, FIG. 5) that the requested devices are available and returns control packets via virtual circuit 24 to interface control 28 indicating that such communication with the defined user devices is acceptable (block 112, FIG. 5).

The interface control 28 of the originator selects the virtual channels to be used for each communication and, using control packets, notifies the interface control 42 of the destination end. Information defining the communication on each virtual channel is stored in a local parameter table internal to interface control 28. FIG. 9 represents the local parameter table of interface control 28. Each row of FIG. 9 contains information for one virtual channel. The column "Local User Device" denotes which of user devices 10 is the source for outgoing packets and the receiver for incoming packets for each virtual channel. Similarly, the column "Distant User Device" denotes which of user devices 12 is the source for incoming packets and the destination for outgoing packets for each virtual channel. Information to and from telephone 32 is illustratively, to be sent in virtual channel 1 and information to and from terminal 31 is to be sent in virtual channel 2. After receiving acknowledgement (block 105, FIG. 4) of the acceptance of the proposed communication from destination interface control 42, control 28 transmits control packets to control 42 identifying the virtual channels to be used and the ones of user devices 10 and 12 which are to communicate on those virtual channels (block 106, FIG. 4). This information is stored (blocks 113 and 114, FIG. 5) in control 42 in a local parameter table. FIG. 10 represents the local parameter table of control 42. After the establishment of virtual circuits 23 and 24 and the acknowledgments of user devices and their identities is completed, actual packetized communication can begin over the existing virtual circuit. In the preceding example sending a request over the virtual circuit (block 104, FIG. 4) and sending channel allocation specifies (block 106, FIG. 4) are two separate operations. It should be noted that a single control message could be used to send the request over the virtual circuit and to send channel allocation specifics. If the destination honors the communication request the channel allocation specifics would be stored. Alternatively, if the destination does not honor the communication request the channel allocation specifics could be discarded.

When a single communication involves multiple sources and destinations, such as the illustrative communication between telephone 32 and terminal 31 of user devices 10 and telephone 34 and terminal 33 of user devices 12, maintaining the timing relationships between signals generated at one end and used at a remote end is valuable. For example, if an operator at network interface 25 wants to orally explain what is being typed at terminal 31 the timing between explanation and typing should be substantially maintained at the destination telephone 34 and terminal 33. The network interface 25 and 29 of the present embodiment in conjunction with the virtual circuit of the packet network 14 are used to maintain these time relatioships. The functions performed by the combiners e.g., 26 and distributors e.g., 27 are instrumental in maintaining these time relationships.

Combiner 26, operating under the control of interface control 28, accumulates data from user devices e.g., telephone 32 and terminal 31, formulates packets from the accumulated data and transmits those packets in selected virtual channels on the virtual circuit via port 17. Distributor 27 receives packets from the virtual circuit via port 17 and distributes the packets so received to selected user devices 10. FIG. 3 represents a preferred embodiment of a network interface 25 in which the separate functions of combiner 26 and distributor 27 have been partially combined. The embodiment of FIG. 3 includes a shared memory 55 through which all packet communication flows. FIG. 3 also shows telephone 32 as being a standard analog subscriber telephone which is connected to shared memory 55 by a signal processor 54 acting as an analog/digital converter. After a virtual circuit e.g., 23 has been established and the local parameter table (FIG. 9) prepared, interface control 28 allocates two blocks of shared memory 55 to each user device 10 which is to take part in communicating on the virtual circuit. illustratively, two memory blocks 60 and 61 are allocated for terminal 31 and two blocks 62 and 63 are allocated for telephone 32. This embodiment also includes a packet interface 53 which transmits packets on the virtual circuit and receives packets from the virtual circuit. Two memory blocks 64 and 65 are allocated to packet interface 53. One allocated memory block 60, 63 and 64 for terminal 31, telephone 32 and packet network 53 is used in the combiner functions and the other memory block 61, 62 and 65 is used in the distributor function.

Figure 11:
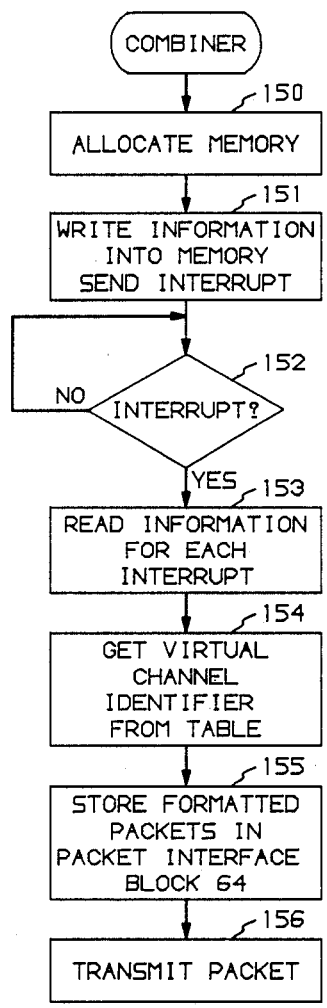
FIGS. 11 and 12 are flow diagrams of combiner and distributor functions performed by the embodiments.

The following is a description of the combiner function and should be read in conjunction with the flow diagram of FIG. 11. Each user device e.g., 31 and 32 is capable of writing data into the block of shared memory e.g., 60, 63 allocated thereto. When a user device stores information in shared memory 55, that user device transmits an interrupt to the interface control 28 (block 151, FIG. 11). Thus each interrupt represents a data entry into a memory block of a user device. If an interrupt has been generated (block 152, FIG. 11) interface control 28, reads (block 153, FIG. 11) information from the allocated blocks of shared memory 55 on a round robin basis. The rate at which interface control 28 periodically initiates the reading cycle and the maximum number of data words read from each block is a function of the overall data rates of all active user devices and the individual data rate of each active user device, respectively. For example, the telephone 32 may require a high data rate and the terminal 31 may require a relatively lower data rate. The period for initiating a round robin read cycle is determined by the combined rates of the terminal and the telephone, while the predetermined number of data words read from each block during each cycle is determined by the relative data rates of the individual user devices. That is, during each cycle, a large number of data words may be read from the memory block 63 associated with the telephone 32, and a relatively smaller number of data words may be read from the memory block 60 associated with the terminal 31. Information is read from the allocated memory blocks such that the oldest interrupt is serviced first. No attempt is made to read from a memory block during a read cycle for which no interrupt has been generated. When data associated with a given user device is read by interface control 28 from an allocated memory block the local parameter table FIG. 9 is accessed (block 154, FIG. 11) to determine the virtual channel used by that user device. Interface control 28 formats a packet from the data read by including the virtual channel identifier determined from the local parameter table and the known destination header for packets on the virtual circuit. The formatted packet is then written (block 155, FIG. 11) by interface control 28 into the block of memory 64 allocated to packet interface 53. Packet interface 53 reads the packets stored in allocated memory 64 and transmits them (block 156, FIG. 11) in FIFO order to packet network 14.

In the preceding description packet interface 53 reads and writes allocated memory blocks 64 and 65 for the movement of data packets to and from the virtual circuit. It should be noted that as an alternative packet interface 53 could be notified of the actual address of memory blocks 60 through 63 associated with user devices and the memory blocks 60 through 63 could be read and written directly by packet interface 53. This would require somewhat greater intelligence on the part of packet interface 53, but would eliminate the need to move data blocks within shared memory 55. Further, it should be understood that although the preceding description specifically relates to the transmission and response to interrupts any type of notice to the control structure may be employed. For example, the hardware and software architecture of the arrangement may make subroutine or procedure calls more efficient. The use of notice signaling types other than interrupts is clearly within the scope of the present invention.

Figure 12:
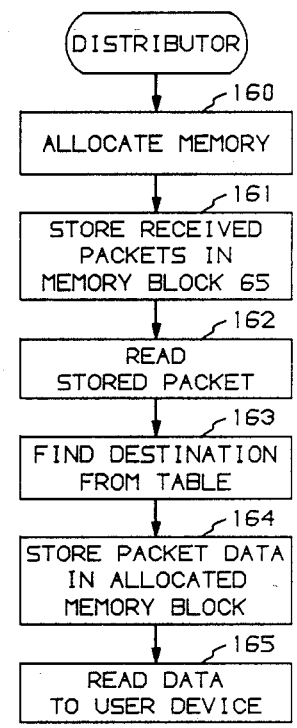

The following is a description of the distribute function and should be read in conjunction with FIG. 12. Packet interface 53 receives all packets from the virtual circuit and stores them in previously allocated (block 160, FIG. 12) memory 64 (block 161, FIG. 12). An interrupt is transmitted from packet interface 53 to interface control 28 when a packet is received. In response to the interrupt, interface control 28 reads (block 162, FIG. 12) a packet from memory, identifies the virtual channel conveying the packet by reading the virtual channel identifier and accesses the local parameter table (FIG. 9) to determine (block 163, FIG. 12) the user device which is to receive packets from the identified virtual channel. The packet is then stored (block 164, FIg. 12) in the memory block of the user device so determined. In accordance with the present example, packets received in virtual channel 1 are stored in memory block 62 which is allocated to telephone 32 and packets received in virtual channel 2 are stored in memory block 61 which is allocated to terminal 31. Each user device e.g., 31 and 32 is capable of reading information stored in the memory block allocated thereto. Accordingly a packet written into one of the memory blocks 61 and 62 is read (block 165, FIG. 12) by the associated user device 31 and 32, respectively. Network interface 29 operates in a manner substantially identical to that described above for network interface 25.

Figure 6:
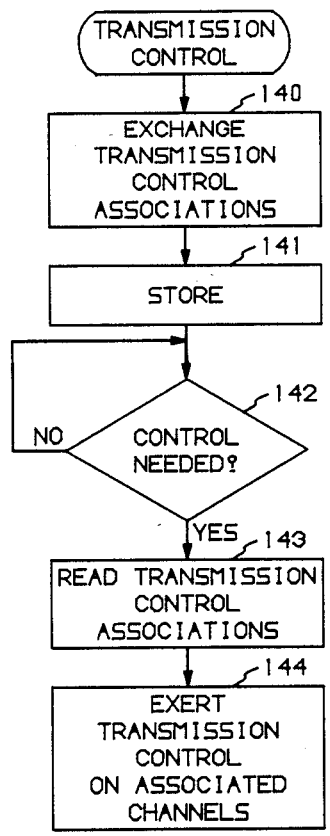
Figure 7:
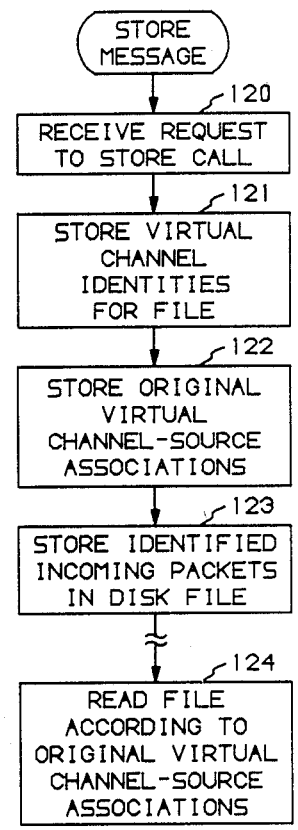
Figure 8:
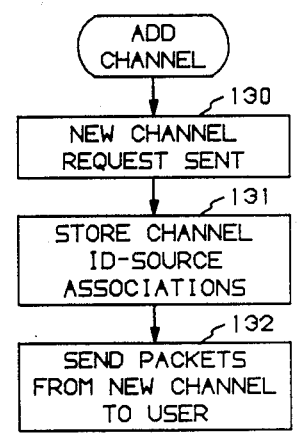

The arrangements described above provide a versatile system for coordinating actions between the remote ends of a packet communication. The following text and the flow diagrams of FIGS. 6 through 8 show specific uses of the present system. The preceding description relates to a request for communication between groups of user devices and either the acceptance or the denial of such communication by the proposed destination. A destination may not be able to complete a virtual call as requested by the originator, such as when no essential human operator is present, but a disk store is still available. In this case, the origination and destination interface controllers, e.g. 28 and 42 can still complete a virtual circuit, transmit a virtual circuit stream of interleaved packets and store the packets in a disk store file at the destination. After receiving a request for storage of a communication (block 120, FIG. 7) the destination interface control, e.g. 42, stores information in its parameter table (block 121, FIG. 7) defining that certain incoming virtual channels (this may be less than all) are to be sent to a file in disk store 58 as a destination. Interface control 42 also stores (block 122, FIG. 7) information defining the original association of virtual channels with user devices which later information is used when the file is read from disk. The originating network interface 28 formulates the same packet stream, including virtual channel identifiers with each packet, that would be included in a telephone-to-telephone and terminal-to-terminal virtual communication. The destination interface controller, e.g. 42, however, in response to control information in its local parameter table transmits the identified virtual channels of the packet stream to a file in the disk store (block 123, FIG. 7) via an allocated memory block of the shared memory 55. When an operator addresses the file so stored, the interface control 42 reads the file and interprets the virtual channel identifies of each packet stored in the file in accordance with the stored original associations. Based on this interpretation the individual data packets are stored in memory blocks allocated to the original requested user devices. The information is then read and used by those user devices.

An established virtual circuit will continue to be used, as discussed, to convey packets among user devices defined in the initial control messages. From time to time, however, it may be desirable to add an additional source and destination user device to an existing virtual circuit. For example, during an existing communication from a telephone and terminal to another telephone and terminal it may be desirable to transfer a file from a disk storage device, e.g. 57, associated with one network interface of a communication to a disk storage device, e.g. 58 associated with the other network interface to the communication. The requesting party enters, at a terminal, e.g. 31, a request to add the disk storage devices to the existing virtual circuit. Interface control, e.g. 28, receives the request and in response allocates a block of shared memory 55 to the disk storage device 57 containing the file to be transferred. Interface controller 28 also transmits control packets on the virtual circuit, requesting the connection of a disk storage device 58 at network interface 29 and giving the identity of the virtual channel identifier (channel 3) to be used for the file transfer. Interface controller, 42, at the destination of the virtual circuit, receives the control packets and allocates a block of shared memory 55 to the disk store, stores (block 131, FIG. 8) the virtual channel identifier of the channel to be added and returns a control message over the virtual circuit, indicating that the newly requested communication can commence. Interface controller 28, at the originator, then notifies disk store 57 to begin transmission of the requested file. Disk store 57 sends the file to the allocated space in shared memory 55 and begins to transmit interrupt requests. The interface controller 28 responds to interrupt requests from the disk store 57 at the rate for such transfers and uses the information in the allocated block to format packets (concurrently with its formation of other packets for the virtual network), including the network destination and the virtual channel identifier assigned to the file transfer. The resulting packets are transmitted, interleaved with the other packets, over the existing virtual circuit to the output port 20 identified by the destination header. Interface controller 42 interprets each received packet and based on the virtual channel identifier of the disk store packets, writes such in the block of shared memory 55 allocated to the disk-store-to-disk-store communication (block 132, FIG. 8). The destination disk store completes the operation by reading from the allocated block of shared memory 55 and storing the information so read, in a file.

When information sources produce too much information for destinations to properly handle, the flow of information must be limited (called flow control). Also, information must be repeated when such is lost or received in error (called error control). Steps to correct either of these instances are referred to herein as transmission control. When multiple communications are taking place in a coordinated manner on a single virtual circuit, having multiple virtual channels, the implementation of transmission control is a difficult task. Transmission control problems are solved in the present embodiment by coordinating transmission control operations using information exchanged in control messages over the virtual circuit. Such control messages are exchanged (block 140, FIG. 6) when the virtual channels are established and, define the association for transmission control purposes of the individual virtual channels. For example, virtual channel 1 is to be used for a telephone connection between two people and virtual channels 2 and 3 relate to a coordinated communication between terminals 31 and 33 and between disk stores 57 and 58, respectively. When virtual channels 1, 2, and 3 are established, transmission control information is exchanged, which indicates that when transmission control is exercised on one of the channels 2 and 3, the same should be exercised on the other, so that coordination between these two channels is maintained. Similarly, control information is exchanged, indicating that transmission control for virtual channel 1 should not impact any other channel. Transmission control association information is stored (block 141, FIG. 6) in the local parameter tables. Transmission control associations are shown in the last column of FIGS. 9 and 10 for interface controls 28 and 42, respectively. The need for transmission control is discovered in the known manner such as the erroneous receipt of a packet or the receipt of too much information over a virtual channel. Illustratively, when a transmission control need is discovered (block 142, FIG. 6) for virtual channel 2, the interface control, e.g. 42, recognizing such, reads (block 143, FIG. 6) its local parameter table (FIG. 10) to determine if any other channel should also be transmission controlled. In the present example, the parameters indicate that both virtual channels 2 and 3 should be transmission controlled and appropriate transmission control is started for both (block 144, FIG. 6). Channel 1 will be allowed to continue without transmission control. However, if a need for transmission control is discovered on channel 1, no transmission control will be exercised on unrelated (for transmission control purposes) channels 2 and 3.

What is claimed is:

1. In a packet communication arrangement comprising a first interface means, a second interface means and a virtual circuit through a packet network between said first and said second interface means, a method comprising;

communicating control information packets between said first and said second interface means over a predetermined virtual channel of said virtual circuit, said control information defining allocations of a plurality of virtual channels on said virtual circuit for communication of data packets in said virtual channels; and distributing, by said interface means, data packets received from said virtual channels in accordance with the allocations thereof defined in said control information.

2. The method of claim 1 wherein each of said interface means is connected to a plurality of data destinations and said control information packets define a data destination as the destination for data packets conveyed in each of said virtual channels, comprising storing said control information at said first and said second interface means and said distributing step comprises;

determining the virtual channel of each data packet received from said virtual circuit;

reading said stored control information to identify one of said data destinations as the destination of data packets received in the virtual channel determined in the determining step; and conveying received data packets to the identified data destination.

3. The method of claim 2 wherein a block of memory is allocated to each data destination and said conveying step comprises;

writing received data packets in the block of memory allocated to the identified data destination; and reading, by the identified data destination, data packets stored in the block of memory allocated thereto.

4. In a packet communication arrangement comprising a first interface means a second interface means and a virtual circuit through a packet network between said first and said second interface means a method comprising;

communicating control information packets between said first and said second interface means over a predetermined virtual channel of said virtual circuit, said control information defining allocations of a plurality of virtual channels on said virtual circuit for communication of data packets in said virtual channels; and generating, on said virtual circuit, data packets for said communications in virtual channels in accordance with allocations thereof in said control information.

5. The method of claim 4 wherein each of said interface means is connected to a plurality of data sources and said control information packets define a data source as the source for data packets in each of said virtual channels, comprising storing said control information at said first and said second interface means and said generating step comprises;

accumulating data from one of said data sources;

reading said stored control information to determine the virtual channel which is to convey data packets friom said one of said data sources; and transmitting the data accumulated from said one of said data sources in the virtual channel determined in said reading stored control information step.

6. In a packet communication arrangement comprising an originating interface means, a destination interface means and a virtual circuit through a packet network between said originating and said destination interface means, a method comprising;

exchanging control information packets between said originating interface means and said destination interface means over a predetermined virtual channel of said virtual circuit, said control information defining a plurality of virtual channels on said virtual circuit and defining at least one of a plurality of user devices at said originating interface means to be a source of data for each of said virtual channels and at least one of a plurality of user devices at said destination interface means to be a destination for data packets received in each of said virtual channel;

transmitting from said originating interface means data packets from said user devices in one of said virtual channels on said virtual circuit; and distributing, at said destination interface means, data packets received in a virtual channel from said virtual circuit to a user device under control of said control information.

7. The method of claim 6 wherein each virtual channel is identified by a unique virtual channel identifier and said transmitting step comprises;

transmitting data packets comprising a virtual channel identifier;

and said distribution step comprises reading the virtual channel identifier of each received data packet and distributing each received data packet to one of said user devices at said destination interface means defined by said control information to be a destination for data packets received in the virtual channel identified by the virtual channel identifier of the received data packet.

8. The method of claim 6 wherein said predetermined one of said virtual channels is identified by a predetermined virtual channel identifier and said step of exchanging control information comprises exchanging control packets comprising said predetermined virtual channel identifier.

9. The method of claim 6 comprising the step of storing said control information at said originating interface means and said step of transmitting comprises;

accumulating data from a given user device at said originating interface means;

determining the virtual channel for which said given user device is defined to be the source of data by reading said control information stored at said originating interface means; and transmitting a data packet comprising the accumulated data from said given user device at said originating interface means in the determined virtual channel.

10. The method of claim 6 comprising the step of storing said control information at said destination interface means; and said distributing step comprises;

determining the virtual channel of a given packet received on said virtual circuit;

identifying the user device at said destination interface means defined to be a destination for data packets received in the determined virtual channel by reading said stored control information; and sending the given received packet to the identified user device.

11. In a packet communication arrangement comprising an originating interface means, a destination interface means, and a packet switch means for completing a virtual circuit between said originating interface means and said destination interface means, a method comprising;

receiving a plurality of requests for communication each request specifying communication between one of a plurality of originating user devices associated with said originating interface means and one of a plurality of destination user devices associated with said destination interface means;

assigning a virtual channel identifier to each requested communication;

transmitting from said originating interface means to said destination interface means over said virtual circuit, the identities of the originating user device and destination user device specified for each communication and the virtual channel identifier assigned to each communication;

transmitting on said virtual circuit by said originating interface means a plurality of packets, each packet comprising data from one of said originating user devices and the virtual channel identifier assigned to communication from that originating user device; and distributing, by said destination interface means, each packet received from said virtual circuit to one of said destination user devices specified for the communication to which the virtual channel identifier conveyed in that packet is assigned.

12. In an arrangement comprising a first plurality of user devices connected to a packet network by a first network interface, a second plurality of user devices connected to said packet network by a second network interface and a virtual circuit through said packet network between said first and said second network interfaces, a method comprising;

receiving a request for communication between a specified one of said first plurality of user devices and a specified one of said second user devices;

assigning a virtual channel identifier to the requested communication;

transmitting the virtual channel identifier, the identity of the specified one of said first plurality of user devices and the identity of the specified one of said second plurality of user devices, to said second network interface;

storing the assigned virtual channel identifiers, the identity of the specified one of said first plurality of user devices and the identity of the specified one of said second user devices, in said second network interface;

transmitting on said virtual circuit, by said first network interface data packets comprising data from said specified one of said first plurality of user devices and said assigned virtual channel identifier;

receiving, by said second network interface, each data packet transmitted on said virtual circuit; and distributing each data packet received by said second network, interface comprising said assigned virtual channel identifier to said specified one of said second plurality of user devices.

13. In a packet communication arrangement comprising a first interface means, a second interface means and a virtual circuit through a packet network between said first and said second interface means, said virtual circuit comprising at least one existing virtual channel for conveying data packets between said first and said second interface means, a method comprising;

receiving a request for a virtual channel between a specified one of a plurality of user devices at said first interface means and a specified one of a plurality of user devices at said second interface means;

exchanging control information between said first interface means and said second interface means over said virtual circuit said control information defining a new virtual channel in addition to said existing virtual channel, said specified one of said user devices at said first interface means and said specified one of said user devices at said second interface means; and exchanging data packets between said specified one of said user devices at said first interface means and said specified one of said user devices at said second interface means over said new virtual channel under the control of said control information.

14. In a packet communication arrangement comprising a first interface means, a second interface means and a virtual circuit through a packet network between said first and said second interface means, a method comprising;

exchanging control information between said first and said second interface means over said virtual circuit, said control information defining a plurality of virtual channels over said virtual circuit and allocations of said virtual channels for discrete communication of data packets in said virtual channels;

exchanging control information comprising transmission control information defining that when a need for transmission control is determined for a first one of said virtual channels transmission control is to be employed on one other virtual channel;

distributing, by said interface means, data packets received from said virtual channels in accordance with the allocations thereof defined in said control information;

determining a need for transmission control on said first one of said virtual channels; and employing transmission control on said first one of said virtual channels and said other one of said virtual channels in response to said need for transmission control determined in said determining step.

15. A digital packet communication arrangement comprising;

an originating interface means;

a destination interface means;

a packet switching means for establishing a virtual circuit between said originating interface means and said destination interface means and said originating interface means comprises;

means for generating and transmitting control information packets in a predetermined virtual channel on said virtual circuit, said control information defining a plurality of virtual channels over said virtual circuit and allocations of said virtual channels for discrete communication of data packets in said virtual channels; and said destination interface means comprises;

means for distributing data packets received from said virtual channels on said virtual circuit in accordance with the allocations thereof defined in said control information.

16. A digital packet communication arrangement comprising;

an originating network interface means;

a destination network interface means;

a packet switching means for establishing a virtual circuit between said originating interface means and said destination interface means;

said originating network interface means comprises means for generating and transmitting control information packets in a predetermined virtual channel on said virtual circuit, said control information defining a plurality of virtual channels over said virtual circuit and allocations of said virtual channels for discrete communication of data packets in said virtual channels; and means responsive to said control information for transmitting on said virtual circuit data packets for said discrete communications in virtual channels in accordance with the allocations thereof defined by said control information.

* * * * *